(12) United States Patent
Papadopoulos et al.

(10) Patent No.: US 12,155,199 B2
(45) Date of Patent: Nov. 26, 2024

(54) ELECTRONIC CIRCUIT BREAKER FOR A VEHICLE, AND A METHOD THEREFOR

(71) Applicant: Scania CV AB, Södertälje (SE)

(72) Inventors: Georgios Papadopoulos, Edessa (GR); Carl Tengstedt, Grödinge (SE); Jens Gustavsson, Strängnäs (SE); Christer Roos, Rönninge (SE); Hans-Peter Nee, Bro (SE)

(73) Assignee: Scania CV AB, Södertälje (SE)

( * ) Notice: Subject to any disclaimer, the term of this patent is extended or adjusted under 35 U.S.C. 154(b) by 18 days.

(21) Appl. No.: 17/638,967

(22) PCT Filed: Sep. 3, 2020

(86) PCT No.: PCT/SE2020/050834
§ 371 (c)(1),
(2) Date: Feb. 28, 2022

(87) PCT Pub. No.: WO2021/045670
PCT Pub. Date: Mar. 11, 2021

(65) Prior Publication Data
US 2022/0329061 A1    Oct. 13, 2022

(30) Foreign Application Priority Data

Sep. 5, 2019  (SE) .................................. 1951012-2

(51) Int. Cl.
*H02H 7/22*   (2006.01)
*B60R 16/023*   (2006.01)
(Continued)

(52) U.S. Cl.
CPC ........... *H02H 7/22* (2013.01); *B60R 16/0238* (2013.01); *B60R 16/033* (2013.01);
(Continued)

(58) Field of Classification Search
CPC ............ H02H 3/087; H02H 7/18; H02H 7/22; H01M 50/296; H01M 50/583;
(Continued)

(56) References Cited

U.S. PATENT DOCUMENTS

| 8,664,883 B2 | 3/2014 | Hiramatu et al. |
| 10,348,107 B2 * | 7/2019 | Sung ..................... H02J 7/0068 |

(Continued)

FOREIGN PATENT DOCUMENTS

| CN | 102025139 A | 4/2011 |
| CN | 102438349 A | 5/2012 |

(Continued)

OTHER PUBLICATIONS

Scania CV AB, International Patent Application No. PCT/SE2020/050834, International Preliminary Report on Patentability, Mar. 8, 2022.

(Continued)

*Primary Examiner* — Hal Kaplan
(74) *Attorney, Agent, or Firm* — Moore & Van Allen PLLC; W. Kevin Ransom

(57) ABSTRACT

An electronic circuit breaker for a vehicle, comprising: an input configured to be connected to a DC power supply; an output configured to be connected to a load; said input connected to said output via a semiconductor switch with a linear region of operation, and a saturated region of operation, said semiconductor switch comprises a switch control input; a switch driver configured to control the semiconductor switch and comprising a switch control output; wherein said switch control output is connected to the switch control input via a pre-charge circuit comprising a turn-"ON" branch which is configured to cause the semiconductor switch to operate in the linear region of operation during (Continued)

turn-"ON"; and a turn-"OFF" branch which is configured to cause the switch to turn-"OFF".

11 Claims, 2 Drawing Sheets

(51) Int. Cl.
*B60R 16/033* (2006.01)
*H01M 50/296* (2021.01)
*H01M 50/583* (2021.01)
*H02G 3/08* (2006.01)

(52) U.S. Cl.
CPC ....... *H01M 50/296* (2021.01); *H01M 50/583* (2021.01); *H02G 3/08* (2013.01); *H01M 2200/103* (2013.01)

(58) Field of Classification Search
CPC ......... H01M 2200/103; B60R 16/0238; B60R 16/033; H02G 3/08; B60L 3/04
USPC .................................................. 307/9.1, 10.1
See application file for complete search history.

(56) References Cited

U.S. PATENT DOCUMENTS

| | | |
|---|---|---|
| 2007/0108959 A1 | 5/2007 | Amano |
| 2007/0230229 A1 | 10/2007 | Bryan et al. |
| 2010/0116570 A1 | 5/2010 | Sugawara et al. |
| 2011/0234177 A1* | 9/2011 | Kohara .................. B60L 50/51 320/166 |
| 2015/0251542 A1 | 9/2015 | Mensah-Brown et al. |
| 2017/0133837 A1 | 5/2017 | Hasan et al. |

FOREIGN PATENT DOCUMENTS

| | | |
|---|---|---|
| CN | 102761252 A | 10/2012 |
| CN | 103262415 A | 8/2013 |
| CN | 107370356 A | 11/2017 |
| CN | 109130893 A | 1/2019 |
| DE | 102012017679 A1 | 3/2013 |
| DE | 102011089946 A1 | 6/2013 |
| EP | 2368749 A2 | 9/2011 |
| EP | 2523333 A1 | 11/2012 |
| EP | 3200312 A1 | 8/2017 |
| EP | 3402072 A1 | 11/2018 |
| EP | 3421287 A1 | 1/2019 |
| JP | 2012028048 A | 2/2012 |
| WO | 2012087320 A1 | 6/2012 |

OTHER PUBLICATIONS

Scania CV AB, International Patent Application No. PCT/SE2020/050834, International Search Report, Oct. 15, 2020.
Scania CV AB, International Patent Application No. PCT/SE2020/050834, Written Opinion, Oct. 15, 2020.
Scania CV AB, Swedish Patent Application No. 1951012-2, Office Action, Feb. 24, 2020.
Scania CV AB, European Patent Application No. 20861214.3, Extended European Search Report, Sep. 4, 2023.
Scania CV AB, Chinese Patent Application No. 202080057400.X, Decision of Rejection, Mar. 13, 2024.
Scania CV AB, Chinese Patent Application No. 202080057400.X, First Office Action, Nov. 11, 2023.

* cited by examiner

ELECTRONIC CIRCUIT BREAKER FOR A VEHICLE, AND A METHOD THEREFOR

CROSS-REFERENCE TO RELATED APPLICATIONS

This application is a National Stage Patent Application (filed under 35 § U.S.C. 371) of PCT/SE2020/050834, filed Sep. 3, 2020 of the same title, which, in turn claims priority to Swedish Patent Application No. 1951012-2 filed Sep. 5, 2019 of the same title; the contents of each of which are hereby incorporated by reference.

FIELD OF THE INVENTION

The present invention relates to an electronic circuit breaker for a vehicle comprising: an input configured to be connected to a DC power supply; an output configured to be connected to a load; said input connected to said output via a semiconductor switch with a linear region of operation, and a saturated region of operation, said semiconductor switch comprises a switch control input; a switch driver configured to control the semiconductor switch and comprising a switch control output.

The invention also relates to a battery junction box comprising such an electronic circuit breaker, and battery pack comprising such a battery junction box.

BACKGROUND OF THE INVENTION

Modern vehicles with electric motors include a DC supply system, this system is within the art called a DC link. The DC link is connected to inverters and battery packs of the vehicle, as well as to various other sub-systems. The DC link usually exhibits some capacitance and inductance due to cables in the wiring, and in some cases the DC link includes a DC link capacitor that prevents transients from the load side going back to the battery pack. The presence of capacitance in the DC link may induce a large inrush current during connection of a battery pack to the DC-link. Conventional battery packs with battery junction boxes employs a specific pre-charge circuit to charge the DC link capacitance.

High energy propulsion batteries require components to ensure safety in the case of the pre-charge phase of the DC-link capacitance of the electric power train of the vehicle. The pre-charge is commonly provided by a particular pre-charge branch within the battery junction box which is explicitly used for that purpose. The pre-charge branch is in parallel with one of the main contactors and it consists of a contactor and a resistor. The contactor of the pre-charge branch is initially connected, and the resistor is used to limit the inrush current. When the voltage at the capacitance of the vehicle reaches 95% of the rated system voltage, the contactor at the main branch is connected while the pre-charge contactor is disconnected.

It is thus an object of the present invention to provide an electronic circuit breaker that provides improved pre-charge capabilities without affecting the turn-off performance.

A further object of the invention is to provide a battery junction box with a reduced number of components, that enables efficient pre-charge of the capacitance in the DC-link.

SUMMARY OF THE INVENTION

The object of the invention is achieved by means of the initially defined electronic circuit breaker, said electronic circuit breaker being characterized in that said switch control output is connected to the switch control input via a pre-charge circuit, comprising a turn-"ON" branch which is configured to cause the semiconductor switch to operate in the linear region of operation during turn-"ON"; and a turn-"OFF" branch which is configured to cause the switch to turn-"OFF". This allows using the semiconductor switch for charging the capacitance of the load which is configured to be connected.

According to one embodiment, the semiconductor switch is a MOSFET with a drain connected to the input, a source connected to the output, and a gate connected to the switch control input; said pre-charge circuit comprises a first node connected to the switch control input; said pre-charge circuit comprises a second node connected to the switch control output; said first node is connected to said second node via said turn-"ON" branch, which turn-"ON" branch comprises a first resistor; said first node is further connected to said second node via said turn-"OFF" branch, wherein said turn-"OFF" branch comprises a first resistor in series with a first diode, said switch control output is connected to said switch control input via the turn-"ON" branch; and said switch control output is further connected to said switch control input via the turn-"OFF" branch, wherein a cathode of the first diode is connected to the switch control output. This allows the turn-"ON" branch to be activated with a positive voltage on the switch control input, and the turn-"OFF" branch becomes activated when a negative voltage larger than the forward voltage drop of the diode is applied on the switch control input.

According to one embodiment, the turn-"ON" branch further comprises a third node, said third node is connected to said first node via the first resistor, and the third node is connected to the second node via a second resistor, said third node is further connected to the output via a capacitor, thus forming a RC circuit. The RC-circuit causes a gradual increase of the signal at the switch control input and the semiconductor switch gradually starts to conduct current in the linear region of operation.

According to one embodiment, the turn-"ON" branch further comprises a switch for disconnecting the delay from the turn-"ON" branch from the semiconductor switch. This provides the possibility to remove the delay from the turn-"ON" branch from the connected circuit and enables fast turn-"ON" without the associated delay components for pre-charging.

The object of the invention is also achieved by means of a battery junction box for a vehicle, comprising a positive input; a positive output; a negative input; a negative output; said positive output is connected to said negative output via a commutate circuit comprising a diode; said negative input connected to said negative output via a fuse and main switch in series with each other; and characterized in that the battery junction box further comprises an electronic circuit breaker according to the present invention, wherein the input of the electronic circuit breaker is connected to the positive input, and the output of the electronic circuit breaker is connected to the positive output.

The object of the invention is also achieved by means of a battery pack comprising at least one battery module, which comprises at least one interconnected battery cell, and characterized by comprising a battery junction box according to the present invention, wherein said positive input is connected to a positive pole of the battery module, said negative input is connected to a negative pole of the battery module, said positive output is configured to be connected to said negative output via a load of the vehicle.

The object of the invention is also attained by means of a method of an electronic circuit breaker for a vehicle, wherein the electronic circuit breaker comprises an input connected to an output via a semiconductor switch with a linear region of operation, and a saturated region of operation, and a switch driver configured to control the semiconductor switch, wherein the method is characterized by: a) receiving a control signal; b) determining that the control signal is a turn-on signal; and c) maneuvering the semiconductor switch to operate in the linear region during a period, upon receiving said turn-on signal.

According to one embodiment, said period is a predetermined interval of time.

According to one embodiment, said period is defined by supplying a predetermined current in the linear region of operation of the semiconductor.

Further features and advantages of the invention will be presented in the following detailed description of embodiments.

DETAILED DESCRIPTION OF THE INVENTION

The present inventors have realized that the problem of pre-charging a capacitance in a DC link may be solved by means of utilizing the linear region of operation of a semiconductor switch such as a MOSFET device.

Shortly, the linear region of operation of a MOSFET device is the region in the Id-Vgs characteristics that shows a linear dependence between the Id drain current and the Vgs gate-source voltage.

Thus, by gradually increase the Vgs voltage the current may be controlled such that the large inrush current to the capacitor of the DC-link is avoided without the use of external current limiting resistors in a pre-charge branch.

Figure 1:
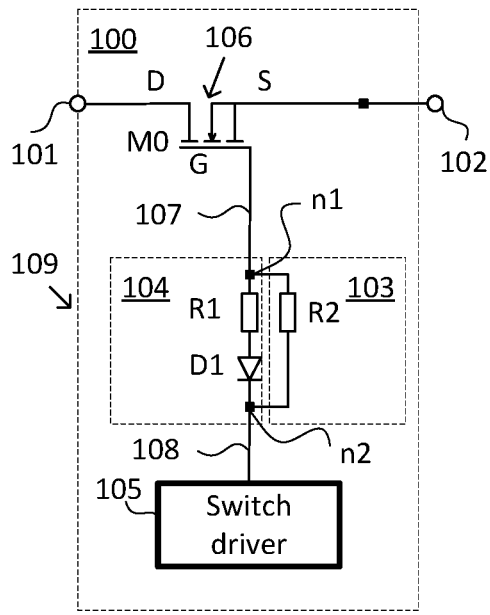
FIG. 1 is a schematic circuit drawing of an electronic circuit breaker according to an embodiment of the present invention.

FIG. 1 shows a circuit diagram of an electronic circuit breaker, generally designated 100, for a vehicle. The electronic circuit breaker 100 comprising: an input 101 configured to be connected to a DC power supply, an output 102 configured to be connected to a load; said input connected to said output via a semiconductor switch 106 with a linear region of operation, and a saturated region of operation, said semiconductor switch comprises a switch control input 107; a switch driver 105 configured to control the semiconductor switch and comprising a switch control output 108. The switch control output 108 is connected to the switch control input 107 via a pre-charge circuit 109, comprising a turn-"ON" branch 103 which is configured to cause the semiconductor switch to operate in the linear region of operation during turn-"ON"; and a turn-"OFF" branch 104 which is configured to cause the switch to turn-"OFF".

The semiconductor switch 106 in FIG. 1 is a MOSFET M0 with a drain D connected to the input 101, a source (S) connected to the output 102, and a gate G connected to the switch control input 107. The pre-charge circuit (109) comprises a first node (n1) connected to the switch control input 107; said pre-charge circuit (109) comprises a second node (n2) connected to the switch control output 108; said first node (n1) is connected to said second node (n2) via said turn-"ON" branch 103, which turn-"ON" branch comprises a first resistor R2; said first node (n1) is further connected to said second node (n2) via said turn-"OFF" branch 104, wherein said turn-"OFF" branch 104 comprises a first resistor R1 in series with a first diode (D1). The switch control output 108 is connected to said switch control input 107 via the turn-"ON" branch 103; and said switch control output 108 is further connected to said control input 107 via the turn-"OFF" branch 104, wherein a cathode of the first diode D1 is connected to the switch control output.

Figure 2:
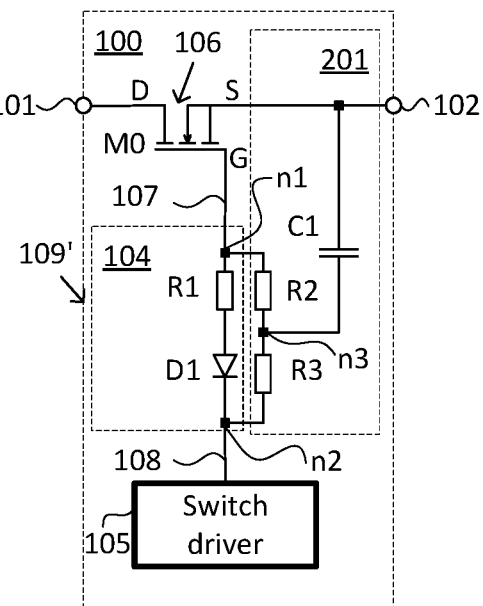
FIG. 2 is a schematic circuit drawing of an electronic circuit breaker according to an embodiment of the present invention.

Now with reference made to FIG. 2 a second embodiment of an electronic circuit breaker 100 will be discussed and this embodiment differs from the embodiment disclosed with reference made to FIG. 1 in that the turn-"ON" branch 103 further comprises a third node (n3), said third node is connected to said first node via the first resistor R2, and the third node is connected to the second node via a second resistor R3, said third node is further connected to the output via a capacitor C1, thus forming a RC circuit. The RC circuit will provide a gradual increase of the voltage at the first node (n1), upon applying a voltage at the second node (n2) by means of the switch driver 105.

Figure 4:
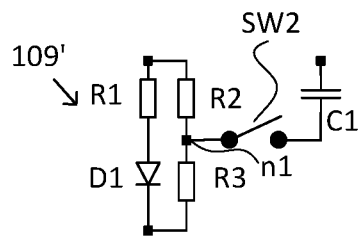
FIG. 4 is a schematic circuit drawing of pre-charge circuit according to an embodiment of the present invention.

In FIG. 4 another embodiment of a pre-charge circuit is disclosed in a circuit diagram, generally designated 109'. The pre-charge circuit 109' differs from the pre-charge circuit disclosed with reference made to FIG. 2 in that the turn-"ON" branch further comprises a switch SW2 configured for disconnecting the delay from the turn-"ON" branch of the semiconductor switch.

Figure 3:
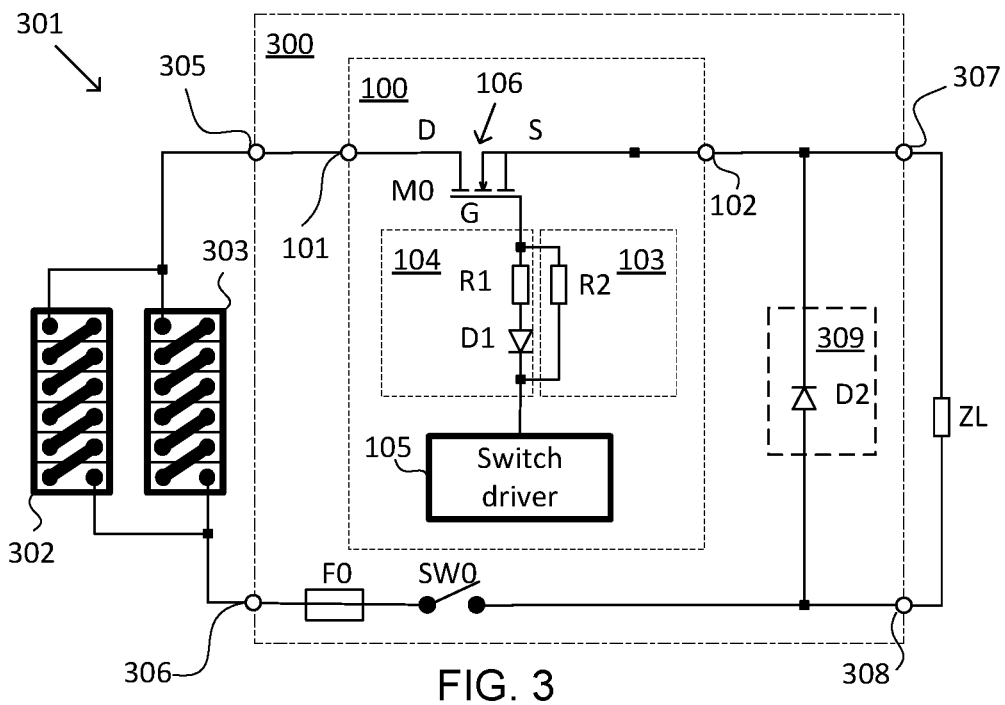
FIG. 3 is a schematic circuit drawing of battery junction box and battery pack according to an embodiment of the present invention.

FIG. 3 shows a battery junction box, generally designated 300, for a vehicle. The battery junction box 300 comprising: a positive input 305; a positive output 307; a negative input 306; a negative output 308. The positive output is connected to said negative output via a commutate circuit 309 comprising a diode D2. The negative input is connected to said negative output via a fuse F0 and main switch SW0 in series with each other. The battery junction box further comprises an electronic circuit breaker 100 according to the present invention, wherein the input 101 of the electronic circuit breaker 100 is connected to the positive input 305, and the output 102 of the electronic circuit breaker is connected to the positive output 307.

FIG. 3 also shows a battery pack, generally designated 301, for a vehicle. The battery pack comprising at least one battery module 302,303 comprising at least one interconnected battery cell; The battery pack further comprises: a battery junction box 300 according to the present invention. The positive input 305 is connected to a positive pole of the battery module. The negative input 306 is connected to a negative pole of the battery module, and the positive output 307 is configured to be connected to said negative output 308 via a load ZL of the vehicle. The load may of course be the DC-link with connected devices as well as other battery packs according to the present invention. The battery pack may include a large number of battery modules which may be connected in various combinations of serial and parallel connections.

Figure 6:
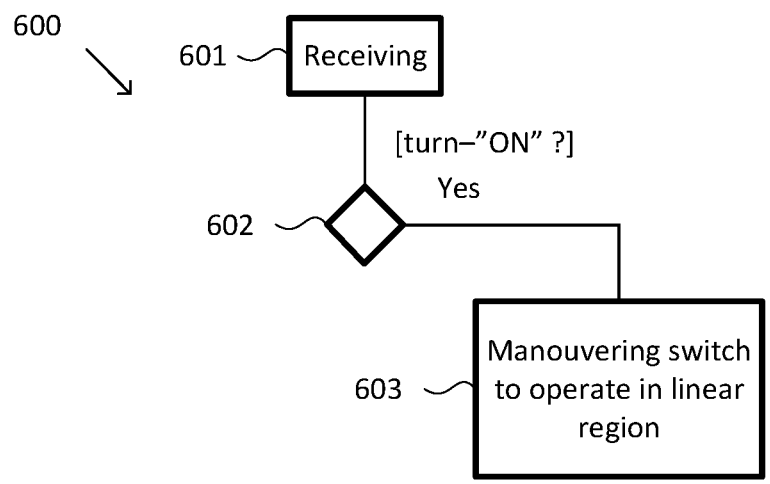
FIG. 6 is a flowchart illustrating an embodiment of the method according to the present invention.

The above disclosed techniques for pre-charging may also be implemented in a computer or a programmable circuit such as an ASIC or FPGA. In FIG. 6 a method of an electronic circuit breaker 100 for a vehicle is disclosed using a flowchart, generally designated 600. The electronic circuit breaker 100 comprises an input 101 connected to an output 102 via a semiconductor switch 106 with a linear region of operation, and a saturated region of operation, and a switch driver 105 configured to control the semiconductor switch.

The method 600 comprises the steps of:
a) receiving 601 a control signal;
b) determining 602 that the control signal is a turn-on signal; and
c) maneuvering 603 the semiconductor switch to operate in the linear region during a period, upon receiving said turn-on signal.

In one embodiment of the method of an electronic circuit breaker 100 for a vehicle said period is a predetermined interval of time. This provides a convenient way of pre-charging if the capacitance of the DC-link is known in advance. In a variant of the method said period is defined by supplying a predetermined current in the linear region of operation of the semiconductor. The pre-charging may be interrupted when a predetermined voltage level of the positive output is attained.

Figure 5:
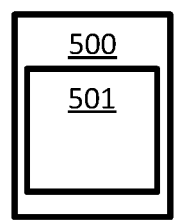
FIG. 5 is a schematic block drawing of a machine and a non-transitory computer readable media.

FIG. 5 shows a non-transitory computer readable medium 501 having information embodied therein, said information including instructions for a machine 500 to execute the method according to embodiments of the present invention as disclosed hereinabove.

The above disclosed embodiments may advantageously be used in a vehicle, the vehicle may comprise an electronic circuit breaker according to embodiments of the present invention, or a battery junction box according to embodiments of the present invention, or a battery pack according to embodiments of the present invention.

In an alternative embodiment the switch control output 108 may be directly connected to the switch control input 107 if the switch driver is configured to provide a switch control signal that maneuvers the semiconductor switch to operate in the linear region during turn-"ON".

The invention claimed is:

1. An electronic circuit breaker for a vehicle, comprising:
an input configured to be connected to a DC power supply;
an output configured to be connected to a load;
a first switch electrically connected between said input and said output, said first switch comprising a semiconductor comprising: a linear region of operation, a saturated region of operation, and a switch control input;
a switch driver configured to control the first switch and comprising a switch control output; and
a pre-charge circuit connected electrically between said switch control output and said switch control input, said pre-charge circuit comprising:
a turn-"ON" branch configured to cause the first switch to operate in the linear region of operation during a turn-"ON" stage; and
a turn-"OFF" branch configured to cause the first switch to turn-"OFF",
wherein said turn-'ON' branch and turn 'OFF' branch of said pre charge circuit connected electrically in parallel,
wherein said turn-"ON" branch comprises a first resistor, and
wherein said turn-"OFF" branch comprises a second resistor in series with a diode.

2. An electronic circuit breaker according to claim 1, wherein:
the first switch is a metal-oxide-semiconductor field-effect transistor (MOSFET) with a drain connected to the input, a source connected to the output, and a gate connected to the switch control input;
said pre-charge circuit comprises:
a first node connected to the switch control input and a second node connected to the switch control output;
said first node is connected to said second node via said turn-"ON" branch;
said first node is further connected to said second node via said turn-"OFF" branch;
said switch control output is connected to said switch control input via the turn-"ON" branch; and
said switch control output is further connected to said control input via the turn-"OFF" branch, and
wherein a cathode of the first diode is connected to the switch control output.

3. An electronic circuit breaker according to claim 1, wherein the turn-"ON" branch further comprises a third node, said third node is connected to said first node via the first resistor, and the third node is connected to the second node via a third resistor, said third node is further connected to the output via a capacitor, thereby forming a resistor-capacitor (RC) circuit.

4. An electronic circuit breaker according to claim 3, wherein the turn-"ON" branch further comprise a second switch connected between the third node and said capacitor, said second switch configured for disconnecting the third node from said capacitor.

5. A method of using the electronic circuit breaker according to claim 1 for a vehicle, wherein the method comprises:
a) receiving a control signal;
b) determining that the control signal is a turn-on signal; and
c) controlling the first switch to operate in the linear region during a period, upon receiving said turn-on signal.

6. A method of using the electronic circuit breaker for a vehicle according to claim 5, wherein said period is a predetermined interval of time.

7. A method of using the electronic circuit breaker for a vehicle according to claim 5, wherein said period is defined by supplying a predetermined current in the linear region of operation of the semiconductor.

8. A non-transitory computer readable media comprising program instructions stored thereon for use with the electronic circuit breaker according to claim 1 for a vehicle, said computer program instructions configured to cause one or more control devices to perform the following operations:
a) receiving a control signal;
b) determining that the control signal is a turn-on signal; and
c) controlling the first switch to operate in the linear region during a period, upon receiving said turn-on signal.

9. A battery junction box for a vehicle, comprising:
a positive input;
a positive output;
a negative input;
a negative output, connected to said negative input via a fuse and a main switch in series with each other;

a commutate circuit electrically connected between said positive output and said negative output, said commutate circuit comprising a diode; and an electronic circuit breaker comprising:
- an input configured to be connected to a DC power supply, said input connected to the positive input of the battery junction box;
- an output configured to be connected to a load, said output connected to the positive output of the battery junction box;
- a semiconductor switch electrically connected between said input and said output, said semiconductor switch comprising: a linear region of operation, a saturated region of operation, and a switch control input;
- a switch driver configured to control the semiconductor switch and comprising a switch control output; and
- a pre-charge circuit connected electrically between said switch control output and said switch control input, said pre-charge circuit comprising:
  - a turn-"ON" branch which is configured to cause the semiconductor switch to operate in the linear region of operation during a turn-"ON" stage; and
  - a turn-"OFF" branch which is configured to cause the semiconductor switch to turn-"OFF".

10. A battery pack for a vehicle, comprising:
a battery module comprising at least one interconnected battery cell; and a battery junction box according to claim 9, wherein:
- said positive input of said battery junction box is connected to a positive pole of the battery module;
- said negative input of said battery junction box is connected to a negative pole of the battery module;
- said positive output of said battery junction box is configured to be connected to said negative output of said battery junction box via a load of the vehicle.

11. A vehicle comprising an electronic circuit breaker comprising:
- an input configured to be connected to a DC power supply, said input connected to a positive input of a battery junction box;
- an output configured to be connected to a load, said output connected to a positive output of the battery junction box;
- a semiconductor switch electrically connected between said input and said output, said semiconductor switch comprising: a linear region of operation, a saturated region of operation, and a switch control input;
- a switch driver configured to control the semiconductor switch and comprising a switch control output; and
- a pre-charge circuit connected electrically between said switch control output and said switch control input, said pre-charge circuit comprising:
  - a turn-"ON" branch which is configured to cause the semiconductor switch to operate in the linear region of operation during a turn-"ON" stage; and
  - a turn-"OFF" branch which is configured to cause the semiconductor switch to turn-"OFF".

* * * * *

UNITED STATES PATENT AND TRADEMARK OFFICE
CERTIFICATE OF CORRECTION

| | | |
|---|---|---|
| PATENT NO. | : 12,155,199 B2 | Page 1 of 1 |
| APPLICATION NO. | : 17/638967 | |
| DATED | : November 26, 2024 | |
| INVENTOR(S) | : Georgios Papadopoulos et al. | |

It is certified that error appears in the above-identified patent and that said Letters Patent is hereby corrected as shown below:

In the Claims

In Column 5, Claim 1, Line 64, --are-- should be added between "circuit" and "connected".

In Column 6, Claim 4, Line 30, "comprise" should be changed to --comprises--.

Signed and Sealed this
Twenty-sixth Day of August, 2025

Coke Morgan Stewart
*Acting Director of the United States Patent and Trademark Office*